Patented Oct. 27, 1925.

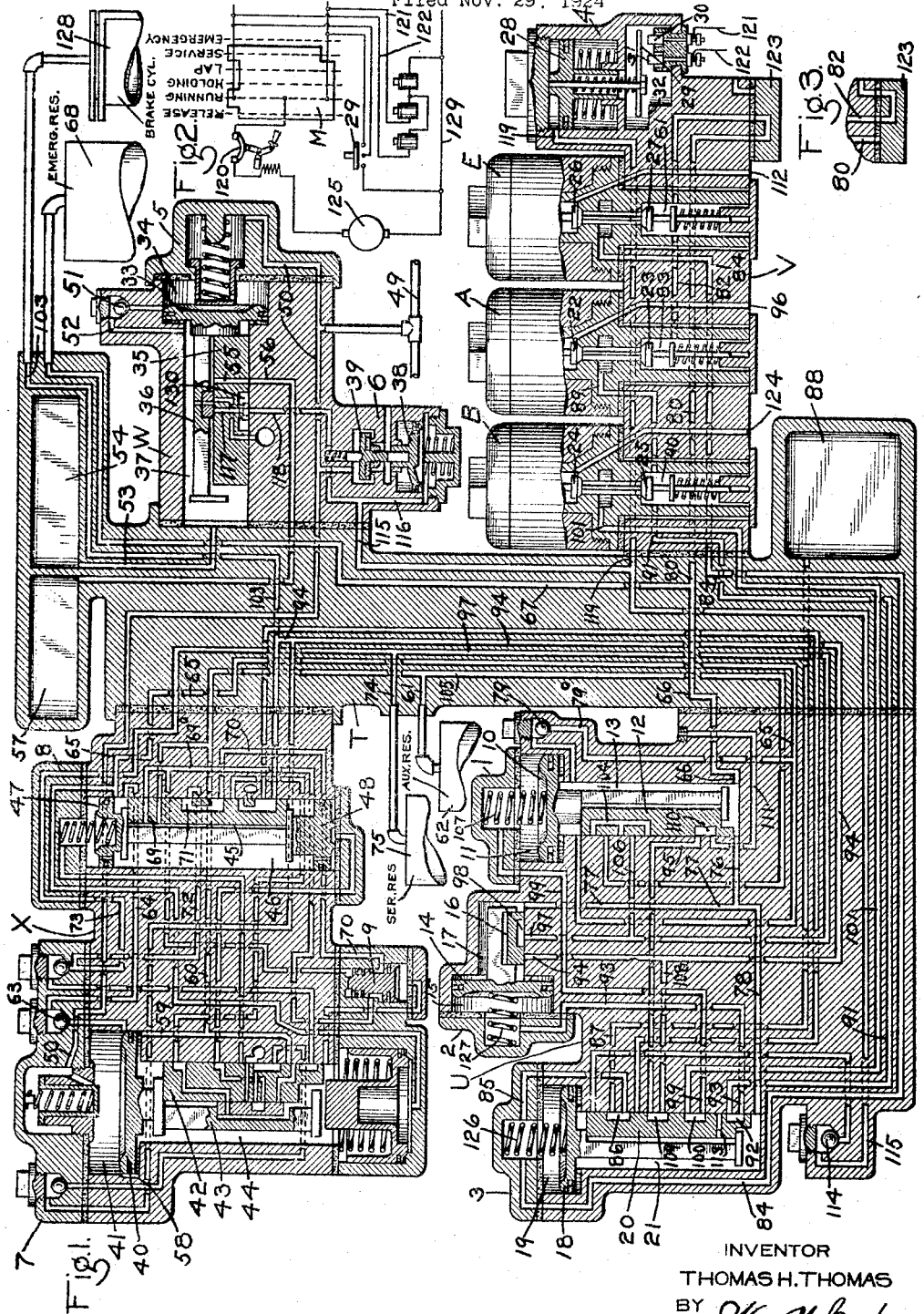

1,558,649

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed November 29, 1924. Serial No. 752,958.

*To all whom it may concern:*

Be it known that I, THOMAS H. THOMAS, a citizen of the United States, residing at Edgewood, in the county of Allegheny and State of Pennsylvania, have invented new and useful Improvements in Electropneumatic Brakes, of which the following is a specification.

This invention relates to fluid pressure brakes, and more particularly to an electropneumatic brake equipment.

It has heretofore been proposed to provide an electro-pneumatic brake equipment comprising a pneumatic portion for controlling the application and release of the brakes, and operating upon a reduction in brake pipe pressure to effect an application of the brakes, and an electrically controlled portion for also controlling the application and release of the brakes. In order to prevent the release of the brakes through the pneumatic portion when the electrically controlled portion is operated to effect an application of the brakes and also through the electrically controlled portion when the pneumatic portion is operated, communication through which fluid is released from the brake cylinder is controlled by both the pneumatic and the electrically controlled portions.

With the above construction, however, it has sometimes happened when the electrically controlled portion is operated to graduate the release of the brakes, that the pneumatic portion may have accidentally been shifted, so that communication from the brake cylinder to the exhaust is closed at the pneumatic portion, so as to interfere with the operation of electrically graduating the release of the brakes.

Such accidental movement of the pneumatic portion may be caused in the following manner, for example; during the releasing period, when the brake valve handle is moved to release position, the brake pipe pressure at the front end of the train will momentarily build up to a higher degree than that at the rear end, so that when the engineman moves his brake valve handle to lap position, a surge of pressure to the rear end of the train will occur. This surge may reduce the pressure at the front end of the train sufficiently to cause the pneumatic portion to move toward service application position, thereby cutting off communication from the brake cylinder through which fluid is released by operation of the electrically controlled portion.

One object of my invention is to provide an electro-pneumatic brake equipment in which the above difficulty is overcome and electric graduated release is thereby assured at any time.

Other objects and advantages will appear from the following more detailed description of the invention.

In the accompanying drawings; Fig. 1 is a sectional diagrammatic view of an electropneumatic brake equipment embodying my invention; Fig. 2 a wiring diagram including a development of the electric brake drum; and Fig. 3 a fragmentary view, showing the cut out cap in cut out position.

According to the construction shown in Fig. 1 of the drawings, the equipment may comprise a pipe bracket portion T to which is secured an electric control portion U consisting of an electrically controlled release valve device 1, an electrically controlled service valve device 2, and an electrically controlled emergency valve device 3.

Associated with the electric control portion in operation and also secured to pipe bracket T, is a magnet bracket portion V which may comprise three magnets A, B, and E, and an electric quick action switch device 4.

Also attached to the pipe bracket portion T is an emergency portion W and a pneumatic portion X. The emergency portion W may comprise an emergency valve device 5 and a pneumatic quick action valve device 6.

The pneumatic portion X may include an equalizing valve device 7, a release valve device 8, and a charging valve device 9.

The electric release valve device 1 may comprise a piston 10 contained in piston chamber 11 and slide valve 12 contained in valve chamber 13 and adapted to be operated by piston 11.

The electric service valve device may comprise a piston 14 contained in piston chamber 15 and adapted to operate a slide valve 16 contained in valve chamber 17.

The electric emergency valve device may comprise a piston 18 contained in piston chamber 19 and adapted to operate a slide valve 20 contained in valve chamber 21.

The magnets A, B, and E are adapted to operate respectively the double beat valves 22 and 23; 24 and 25; 26 and 27, which in turn control the admission and exhaust of fluid under pressure to and from the respective piston chambers of the electrically controlled release, service, and emergency valve devices.

The electric quick action switch device 4 may comprise a piston 28 to the stem of which is attached a plate 29 which is adapted to engage contacts 30, 31, and 32 upon the downward movement of piston 28.

The pneumatic emergency valve device 5 may comprise a piston 33 contained in piston chamber 34 and adapted to operate a slide valve 35 and a graduating valve 36, contained in valve chamber 37. The pneumatic quick action valve device 6 may comprise a piston 38 which is adapted to operate a brake pipe discharge valve 39.

The equalizing valve device 7 may comprise a piston 40 contained in piston chamber 41 and adapted to operate a slide valve 42 and a graduating valve 43, contained in valve chamber 44.

The release valve device 8 may comprise a slide valve 45 contained in valve chamber 46 and adapted to be operated by a double piston having heads 47 and 48.

In operation, the brake pipe 49 is charged in the usual way and from the brake pipe, fluid under pressure flows through passage 50 to piston chamber 34 of the pneumatic emergency valve device, thence through passage 52, past ball check 51, to valve chamber 37 and thence through passage 53 to quick action chamber 54, and also through port 55 in the slide valve 35 and passage 56 to the quick action closing chamber 57, charging said chambers.

Fluid under pressure from the brake pipe 49 flows through passage 50 to piston chamber 41 of the equalizing valve device 7 and through feed groove 58 to valve chamber 44 and thence through passages 59, 60, and 61 to the auxiliary reservoir 62. Fluid also flows from piston chamber 41 through passage 64 past ball check 63 to valve chamber 13 of the electrically controlled release valve device 1. From valve chamber 13 fluid flows through passages 66 and 67 to the emergency reservoir 68, also through passages 76 and 77 to valve chamber 17 of the electrically controlled service valve device 2, and through passages 76 and 78 to valve chamber 21 of the electrically controlled emergency valve device 3.

Passage 79ᵃ, containing ball check valve 79, provides for maintaining the valve chamber 13 charged from passage 65 at times when the passage 65 to the slide valve seat is cut off from said chamber by the outward movement of slide valve 12.

The service reservoir 75 is charged from valve chamber 46 of the release valve device 8 through port 69 and passage 69ᵃ around the charging valve 9 to passage 70 and thence through cavity 71 in the release slide valve 45, when said valve is in release position, to passages 72, 73, and 74, which lead to the service reservoir 75.

Fluid under pressure flows from the emergency reservoir 68 through passages 67 and 80 and the cut out cap 123 to valve chamber 81 below magnet E and thence through passage 82 to valve chamber 83 below the magnet A.

Before proceeding with the further description of the operation, it may be noted, as shown in Fig. 2, that the magnet A has one terminal connected to a control train wire 121 leading to brake drum M, and that the magnet B has one terminal connected to a control train wire 122, leading to the brake drum M. The other terminals of magnets A and B are connected to one terminal of the magnet E, the other terminal of which is connected to return train wire 129, leading to the source of current 125.

By means of the above circuit connections, it will be noted that no separate control wire is employed for the magnet E and that when either of the magnets A or B is energized, the magnet E will be energized, the magnet E being deenergized only when both magnets A and B are deenergized.

When the brake switch is in release position the magnet A and consequently the magnet E are energized and the magnet B is deenergized, as indicated in the diagram, Fig. 2.

The magnet E being energized, the valve 26 is held seated and the valve 27 unseated, allowing fluid under pressure from chamber 81 to flow through passage 84 to piston chamber 19, thus equalizing the fluid pressures on opposite sides of the piston 18 and permitting the spring 126 to move said piston and consequently slide valve 20 to their innermost positions. In the innermost position of slide valve 20, piston chamber 19 is connected through passage 85, cavity 86, and passage 87 with an emergency chamber 88, charging the same with fluid under pressure. The magnet A being energized, the valve 22 is held seated and valve 23 unseated, allowing fluid under pressure from valve chamber 83 to flow through passage 89 to chamber 90 and thence through passage 91, cavity 92, and passage 93 to piston chamber 15. The fluid pressures on opposite sides of piston 14 being thus equalized, the spring 127 moves piston 14 and consequently slide valve 16 to their innermost position in which passage 94 leading to the brake cylinder 128 is blanked.

The magnet B being deenergized, the valve 25 is held seated and valve 24 unseated so that piston chamber 10 of the electrically controlled release valve device 1 is connected to atmosphere through passage 99, cavity 100 in slide valve 20, passage 101, and passage 124. Fluid pressure in valve chamber 13 then shifts the piston 11 and consequently slide valve 12 to their outermost positions, in which communication from the brake cylinder 128 to exhaust port 111, by way of passage 103, passage 94, passage 108, cavity 109 in slide valve 20, and passage 95 is blanked.

Although termed the release position, it will be noted from the foregoing that this position is not the actual release position for releasing fluid from the brake cylinder, the term being employed because the position corresponds with the so-called release position of the standard fluid pressure brake equipment. The running position, however, is the position in which the brake cylinder is open to the exhaust. In running position, as shown on the diagram, Fig. 2, the magnets A and B, and consequently the magnet E, are energized. The magnets A and E being energized, the same connections are made as described in release position, and consequently the pistons 14 and 18 and slide valves 16 and 20 respectively of the electrically controlled service and emergency valve devices are maintained in their innermost positions. The magnet B being energized, the valve 24 is held seated and valve 25 unseated, allowing fluid under pressure from valve chamber 90 to flow past unseated valve 25 through passage 101, cavity 100 in slide valve 20 of the electrically controlled emergency valve device, and through passage 99 to piston chamber 11 of the electrically controlled release valve device 1. The fluid pressure being equalized on opposite sides of piston 10, the spring 107 will shift the piston and consequently slide valve 12 to their innermost positions. In this position of slide valve 12, a connection, independent of the pneumatic release slide valve 45, is made from the brake cylinder 128 to the exhaust, by way of passages 103, 94, and 108, cavity 109 in slide valve 20 of the electrically controlled emergency valve device 3, passage 95, cavity 110 in the slide valve 12 of the electrically controlled release valve device 1, and passage 111. It will now be seen that the brakes are released in running position.

If it is desired to effect a service application of the brakes, the combined brake valve and brake switch (not shown) is moved to service application position. It should here be noted that the combined brake valve and brake switch may correspond with that heretofore employed with electro-pneumatic brake equipments, in which the usual brake valve is moved with the brake switch so as to reduce the brake pipe pressure in service application position and to supply fluid under pressure to the brake pipe in release and running positions. In service application position the magnet A is deenergized, the magnet B is energized, and the magnet E is continued in an energized state by virtue of its connection to magnet B, as shown in Fig. 2 of the drawing.

The deenergization of magnet A, causes valve 23 to seat and valve 22 to unseat, so that the piston chamber 15, of the electrically controlled service valve device 2, is connected to atmosphere by way of passage 93, cavity 92 in slide valve 20, and passage 91, to chamber 90, and thence through passage 89, past unseated valve 22, to exhaust passage 96. The fluid pressure in valve chamber 17 then shifts piston 14 and slide valve 16 to their outermost positions, in which cavity 98 in slide valve 16 connects passages 97 and 94.

The magnet B being energized, the valve 24 is seated and valve 25 unseated, and consequently release piston chamber 10 is connected to atmosphere through passage 99, cavity 100 in slide valve 20, passage 101, and past the open valve 25 to chamber 90, and thence through passage 89, past open valve 22, to exhaust port 96.

With the release slide valve 12 in its outer position, communication through which fluid is released from the brake cylinder is cut off, and at the same time, passage 65 leading to the brake pipe, and passage 105, leading to the auxiliary reservoir 62, are connected through cavity 104 with passage 106 leading to passage 97. Fluid under pressure from the service reservoir 75 is supplied to passage 97 through passage 74 and unites with fluid supplied from the brake pipe and auxiliary reservoir flowing through passage 106, the combined fluid pressures flowing through cavity 98 in slide valve 16 to passage 94 and thence through passage 103 to the brake cylinder 128.

Since both the auxiliary reservoir and brake pipe pressures are reduced in electrically applying the brakes, as above described, the fluid pressures on opposite sides of the equalizing piston 40 remain balanced, consequently the equalizing valve parts are not moved from release position.

If there are cars in the train not equipped with the electro-pneumatic brakes or on which the electric control is non-operative, since the auxiliary reservoir pressure is not reduced on such cars, the equalizing valve device will be shifted to application position, due to the reduction in brake pipe pressure, as effected by the brake valve device in application position and by the venting of fluid from the brake pipe to the brake cylinder on cars where the electric application is being effected.

When it is desired to release the brakes, the combined brake valve and brake switch is moved to release position for a few seconds to build up the brake pipe pressure in the usual way, and then the brake valve handle is moved to running position, in which, as hereinbefore described, a direct connection from brake cylinder 128 to exhaust is made.

If the brake valve is left in running position, the brakes will be entirely released, but if it is desired to effect a graduated release of the brakes, the brake valve should be moved from running to release position, after the brake cylinder pressure has been partially reduced, so as to cut off the further exhaust of fluid from the brake cylinder. Further release of fluid from the brake cylinder may be accomplished by moving the brake valve handle intermittently between running and release positions, as will be evident.

An emergency application of the brakes may be effected by moving the combined brake valve and brake switch to emergency position, in which the brake circuits throughout the train are opened, thereby deenergizing the magnets A, B, and E.

The deenergization of magnet E will cause the valve 27 to seat and valve 26 to be unseated, permitting fluid under pressure from piston chamber 19 of the electrically controlled emergency valve device 3 to pass to atmosphere through passage 84, past unseated valve 26 to exhaust passage 112. The fluid pressure in valve chamber 21 then causes the piston 18 and consequently slide valve 20 to move to the outermost position. In this position, fluid is supplied from valve chamber 21 to piston chamber 15 through passage 93 and also to piston chamber 10 through port 113 in the slide valve 20 and passage 99, the pressure of fluid so supplied serving to maintain the pistons 14 and 11 in their innermost positions.

The slide valve 20, in this position, also connects emergency chamber 88 to the pneumatic quick action piston chamber through passage 87, cavity 86, passage 115, past ball check valve 114, and passage 116, forcing piston 38 upwardly so as to open the discharge valve 39 and thereby vent fluid from the brake pipe to atmosphere to cause an emergency application of the brakes in the usual way, the brake cylinder exhaust having been cut off by the movement of slide valve 20.

When the brake pipe pressure is suddenly reduced by the bursting of a flexible hose between the cars, or otherwise, the emergency piston 33 will be shifted to its outer emergency position and slide valve 35 will be moved so that the valve chamber 37 is connected, through port 117 and passage 118 with passage 116, leading to quick action piston 38, and with passage 115, leading to passage 119 and the switch piston 28. The switch piston 28 is then shifted, so that the switch bar 29 bridges the contacts 30, 31, and 32.

The bridging of contacts 30, 31, and 32 causes a short circuit, which produces an excessive flow of current through the overload switch 120 on the locomotive, so that said switch is operated to open the electric supply circuit and thus cause the deenergization of the electric control circuits 121 and 122 and the consequent deenergization of the magnets A, B, and E. An emergency application of the brakes is thus produced in the manner hereinbefore described.

An emergency application may also be caused by the breaking of wires 121 and 122 leading to magnets A and B respectively. The breaking of wire 121 will deenergize magnet A and cause a service application as before described, but the breaking of wire 122 will have no effect until the combined brake valve and brake switch is moved to service position, when an emergency application will result. The reason for this will clearly be evident, since magnet E is deenergized when both magnets A and B are deenergized.

In case one of the magnets should burn out or for any other reason the equipment on one car should fail to operate electrically, the equipment on such car may be cut out by moving cut-out cap 123 to the position shown in Fig. 3. In this position of cut-out cap 123, the emergency reservoir pressure is cut off from valve chambers 81, 83, and 90, and said chambers are vented to atmosphere. The venting of said chambers to atmosphere will cause an emergency application in the manner hereinbefore described, after which the brakes may be released.

The brakes on the car will thereafter be operated pneumatically and since the valve chambers 81, 83, and 90, are now open to the exhaust, the energization or deenergization of the magnets on the car will have no effect on the electric control portion, but the local venting of the brake pipe to the brake cylinder on cars electrically operated will effect a reduction in brake pipe pressure throughout the train, so that the brakes will be applied pneumatically on cars where the brakes are not being controlled electrically.

It will now be seen, that according to my invention, accidental movement of the pneumatic portion will not interfere with the functioning of the electric graduated release, since, as before described, a communication from brake cylinder to atmosphere is made independently of the pneumatic portion.

Another feature of the equipment is that when the apparatus is not connected up to operate electrically, the apparatus will function pneumatically, according as the brake pipe pressure is varied and in the same manner, as on cars not equipped with the electropneumatic brake; since the emergency valve device 3 will then remain in its outer position, in which, as hereinbefore explained, the service valve device 2 and the release valve device 1 are maintained in their normal positions, as shown in Fig. 1, by fluid under pressure supplied to the piston chambers 15 and 11.

Having now described my invention, what I claim as new and desire to secure by Letters Patent, is:—

1. In an electro-pneumatic brake, the combination with valve means operated by variations in fluid under pressure for controlling the release of the brakes, of electrically controlled means for controlling the release of the brakes independently of the position of said valve means.

2. In an electro-pneumatic brake, the combination with a brake cylinder and valve means operated by variations in fluid under pressure for controlling the release of fluid from the brake cylinder, of electrically controlled valve means having one position in which communication is established for releasing fluid from the brake cylinder through said fluid pressure controlled valve means and another position in which communication is established for releasing fluid from the brake cylinder independently of the position of said fluid pressure controlled valve means.

3. In an electro-pneumatic brake, the combination with a brake cylinder and valve means operated by variations in fluid under pressure for controlling the release of fluid from the brake cylinder, of electrically controlled valve means having one position for establishing a direct communication from the brake cylinder to the exhaust and another position for establishing communication from the brake cylinder to the exhaust through said fluid pressure controlled valve means.

4. In an electro-pneumatic brake, the combination with a brake cylinder and valve means for controlling the release of fluid from the brake cylinder, of an electrically controlled valve device and an electrically controlled valve mechanism having one position for directly connecting the brake cylinder through said valve device to an exhaust port and another position for connecting the brake cylinder through said valve means and said valve device to an exhaust port.

5. In an electro-pneumatic brake, the combination with a brake cylinder and valve means for controlling the release of fluid from the brake cylinder, of an electrically controlled release valve device and an electrically controlled emergency valve mechanism having one position for directly connecting the brake cylinder through said valve device to an exhaust port and another position for connecting the brake cylinder through said valve means and said valve device to an exhaust port.

6. In an electro-pneumatic brake, the combination with a brake cylinder, a triple valve device and a release valve device controlled by said triple valve device for controlling the release of fluid from the brake cylinder, of an electrically controlled valve mechanism having one position in which communication from the brake cylinder through said release valve device to an exhaust port is established and another position in which said communication is cut off.

7. In an electro-pneumatic brake, the combination with electrically controlled means for effecting a service application of the brakes and electrically controlled means for controlling the release of the brakes, of electrically controlled means for effecting an emergency application of the brakes and connected to the control circuits of both the electrically controlled service and release means.

8. In an electro-pneumatic brake, the combination with electrically controlled means for effecting a service application of the brakes and including a magnet having a control circuit and electrically controlled means for controlling the release of the brakes and including a magnet having a control circuit, of electrically controlled means for effecting an emergency application of the brakes and including a magnet connected to both said control circuits.

9. In an electro-pneumatic brake, the combination with electrically controlled means for effecting a service application of the brakes and including a magnet having a control circuit and electrically controlled means for controlling the release of the brakes and including a magnet having a control circuit, of electrically controlled means operative upon deenergization of both magnets for effecting an emergency application of the brakes.

10. In an electro-pneumatic brake, the combination with electrically controlled means for effecting a service application of the brakes and including a magnet having a control circuit and electrically controlled means for controlling the release of the brakes and including a magnet having a control circuit, of electrically controlled means including a magnet and operative upon deenergization of said magnet to effect an emergency application of the brakes, said emergency magnet being connected to the control circuits of both the service and the release magnets so that the emergency magnet is deenergized upon deenergization of both the service and the release magnets.

11. In an electro-pneumatic brake, the combination with a service brake application magnet having a control circuit and a brake release magnet having a control circuit, of an emergency brake application magnet through which the circuits of said service and release magnets are completed.

12. In an electro-pneumatic brake, the combination with a service brake application magnet having a control circuit and a brake release magnet having a control circuit, of an emergency brake application magnet having one terminal connected to a terminal of the service and the release magnets, so that the control circuits are completed through said emergency magnet and thereby the emergency magnet is energized when either the service or the release magnet is energized and is deenergized only when both the service and the release magnets are deenergized.

13. In an electro-pneumatic brake, the combination with a service magnet, a release magnet, and an emergency magnet, of a valve device controlled by said service magnet for effecting a service application of the brakes, a valve device controlled by said release magnet for controlling the release of the brakes, and a valve device controlled by said emergency magnet for effecting an emergency application of the brakes.

14. In an electro-pneumatic brake, the combination with a brake pipe, of electrically controlled means operative to effect an application of the brakes and having means for venting fluid from the brake pipe upon effecting an application of the brakes.

15. In an electro-pneumatic brake, the combination with a brake pipe, of electrically controlled means operative to effect a service application of the brakes and adapted at the same time to effect a reduction in brake pipe pressure.

16. In an electro-pneumatic brake, the combination with a brake pipe, of electrically controlled means for effecting an application of the brakes and including means for cutting off the release of the brakes, said release means being operative in applying the brakes to vent fluid from the brake pipe.

17. In an electro-pneumatic brake, the combination with a brake pipe, of an electrically controlled release valve device operative upon applying the brakes for cutting off the release of the brakes and for venting fluid from the brake pipe.

18. In an electro-pneumatic brake, the combination with a brake pipe, of a brake cylinder and an electrically controlled release valve device having a position in which communication from the brake cylinder to the exhaust is closed and in which fluid is vented from the brake pipe.

19. In an electro-pneumatic brake, the combination with a brake pipe, of a brake cylinder and an electrically controlled release valve device having a position in which communication from the brake cylinder to the exhaust is closed and in which fluid is vented from the brake pipe to the brake cylinder.

20. In an electro-pneumatic brake, the combination with a brake pipe and brake cylinder, of an electrically controlled valve device for controlling the supply of fluid to the brake cylinder to effect an application of the brakes, and an electrically controlled valve device for cutting off communication through which fluid is released from the brake cylinder and for establishing communication from the brake pipe through said application valve device to the brake cylinder.

21. In an electro-pneumatic brake, the combination with a brake pipe, auxiliary reservoir, and brake cylinder, of an electrically controlled valve device for controlling communication through which fluid is supplied to the brake cylinder to effect an application of the brakes and an electrically controlled valve device having a position in which the exhaust from the brake cylinder is closed and in which the brake pipe and the auxiliary reservoir are connected through said application valve device to the brake cylinder.

22. In an electro-pneumatic brake, the combination with a brake pipe, auxiliary reservoir, and brake cylinder, of a service reservoir, an electrically controlled valve device for controlling the supply of fluid from the service reservoir to the brake cylinder to effect an application of the brakes, and an electrically controlled valve device having a position in which the exhaust from the brake cylinder is closed and in which the brake pipe and the auxiliary reservoir are connected through said application valve device with the brake cylinder.

23. In an electro-pneumatic brake, the combination with a valve device operated by a variation in fluid pressure for effecting a service application of the brakes and an electrically controlled valve for varying the fluid pressure on said valve device, of an electrically controlled valve device for effecting an emergency application of the brakes and having a position for establishing communication from said service application valve device to said electrically controlled valve.

24. In an electro-pneumatic brake, the combination with a valve device operated by variations in fluid pressure for controlling the release of the brakes and an electrically controlled valve for varying the fluid pressure on said valve device, of an electrically controlled valve device for effecting an emergency application of the brakes and having a position for establishing communication from said release valve device to said electrically controlled valve.

25. In an electro-pneumatic brake, the combination with a valve device operated by variations in fluid pressure for controlling the release of the brakes, an electrically controlled valve for varying the fluid pressure on said valve device, a valve device operated by variations in fluid pressure for effecting a service application of the brakes, and an electrically controlled valve for varying the fluid pressure on said service valve device, of an electrically controlled valve device for effecting an emergency application of the brakes and having a position for establishing communication from said service valve device and from said release valve device to the corresponding electrically controlled valve.

26. In an electro-pneumatic brake, the combination with a valve device operated by variations in fluid pressure for controlling the release of the brakes and an electrically controlled valve for varying the pressure on said valve device, of an electrically controlled valve device for effecting an application of the brakes and having a position for supplying fluid to maintain the fluid pressure on said release valve device.

27. In an electro-pneumatic brake, the combination with a valve device operated upon a reduction in fluid pressure for cutting off the release of the brakes and an electrically controlled valve for effecting a reduction in fluid pressure on said valve device, of an electrically controlled valve device for effecting an emergency application of the brakes and having a position for supplying fluid to maintain the fluid pressure on said release valve device.

28. In an electro-pneumatic brake, the combination with a valve device operated upon a reduction in fluid pressure for effecting a service application of the brakes and an electrically controlled valve for venting fluid from said valve device, of an electrically controlled valve device for effecting an emergency application of the brakes and having a position for supplying fluid to maintain the fluid pressure on said service application valve device.

29. In an electro-pneumatic brake, the combination with an electrically controlled valve device operated by a reduction in fluid pressure for effecting a service application of the brakes and an electrically controlled valve device operated by a reduction in fluid pressure for cutting off the release of the brakes, of an electrically controlled valve device for effecting an emergency application of the brakes and adapted in emergency application position to supply fluid to maintain the fluid pressure on said service application valve device and on said release valve device.

30. In an electro-pneumatic brake, the combination with valve devices operated upon a reduction in fluid pressure for controlling the application and release of the brakes and electrically controlled means for venting fluid from said valve devices, of an electrically controlled valve device having one position for establishing communication from said valve devices to said electrically controlled valves and another position for supplying fluid under pressure to said valve devices.

31. In an electro-pneumatic brake, the combination with a valve device for controlling the release of the brakes and electrically controlled means for varying the fluid pressure on said valve device, of electrically controlled means for effecting an application of the brakes and for also varying the fluid pressure on said valve device.

32. In an electro-pneumatic brake, the combination with a valve device operated by a reduction in fluid pressure for cutting off the release of the brakes and electrically controlled means for venting fluid from said valve device, of electrically controlled means for effecting an application of the brakes and for also venting fluid from said valve device.

33. In an electro-pneumatic brake, the combination with a valve device operated by variations in fluid pressure for controlling the application of the brakes and a valve device operated by variations in fluid pressure for controlling the release of the brakes, of an electrically controlled valve operative to vent fluid from both said valve devices.

34. In an electro-pneumatic brake, the combination with a valve device operated by variations in fluid pressure for controlling the application of the brakes and a valve device operated by variations in fluid pressure for controlling the release of the brakes, of an electrically controlled valve operative to supply fluid under pressure to both said valve devices.

35. In an electro-pneumatic brake, the combination with a valve device operated by variations in fluid pressure for controlling the application of the brakes and a valve device operated by variations in fluid pressure for controlling the release of the brakes, of a valve for venting fluid from said valve devices, a valve for supplying fluid under pressure to said valve devices, and a magnet for operating said valves.

36. In an electro-pneumatic brake, the combination with a valve device operated by variations in fluid pressure for controlling the application of the brakes and a valve device operated by variations in fluid pressure for controlling the release of the brakes, of electrically controlled valves for varying the fluid pressure on said valve devices and a separate electrically controlled valve for controlling communication from the first mentioned electrically controlled valves to said release valve device.

37. In an electro-pneumatic brake, the combination with a valve device operated by variations in fluid pressure for controlling the application of the brakes and a valve device operated by variations in fluid pressure for controlling the release of the brakes, of electrically controlled valves for varying the fluid pressure on said valve devices and a separate electrically controlled valve for venting fluid from said release valve device and for controlling communication from the first mentioned electrically controlled valves to said release valve device.

38. In an electro-pneumatic brake, the combination with an auxiliary reservoir, brake pipe, and a valve device subject to the opposing pressures of the auxiliary reservoir and brake pipe for controlling the brakes, of electrically controlled means for effecting an application of the brakes and simultaneously venting fluid from the auxiliary reservoir and the brake pipe.

In testimony whereof I have hereunto set my hand.

THOMAS H. THOMAS.